United States Patent [19]
Allinson

[11] Patent Number: 5,821,648
[45] Date of Patent: Oct. 13, 1998

[54] ELECTRICAL MACHINE DRIVE SYSTEM INCLUDING AN OPTICAL POSITION TRANSDUCER CIRCUIT AND METHOD OF OPERATING

[75] Inventor: Damian Paul Allinson, West Yorkshire, England

[73] Assignee: Switched Reluctance Drives Limited, Harrogate, England

[21] Appl. No.: 814,660

[22] Filed: Mar. 11, 1997

[30] Foreign Application Priority Data

Mar. 19, 1996 [GB] United Kingdom .................... 9605697

[51] Int. Cl.$^6$ .......................... H02K 29/06; H02K 29/10
[52] U.S. Cl. ............................ 310/68 B; 318/254
[58] Field of Search .................... 310/68 B; 318/678, 318/683, 615, 375, 640, 254; 364/400

[56] References Cited

U.S. PATENT DOCUMENTS

| | | | |
|---|---|---|---|
| 3,701,043 | 10/1972 | Dukes | 310/68 B |
| 3,819,998 | 6/1974 | Yole | 310/68 B |
| 4,011,487 | 3/1977 | Loomis | 318/254 |
| 4,329,069 | 5/1982 | Herscovici | 310/68 B |
| 4,535,405 | 8/1985 | Hill et al. | 318/254 |
| 4,698,537 | 10/1987 | Byrne et al. | 310/168 |
| 4,698,562 | 10/1987 | Gale et al. | 318/254 |
| 4,779,031 | 10/1988 | Arends et al. | 318/565 |
| 4,855,734 | 8/1989 | Elsdoerfer | 340/870.31 |
| 5,427,193 | 6/1995 | Avakian | 180/65.5 |
| 5,491,391 | 2/1996 | Bahr et al. | 318/39 |

FOREIGN PATENT DOCUMENTS

| | | | |
|---|---|---|---|
| 2 045 555 | 10/1980 | United Kingdom | H02P 6/02 |
| 1 597 379 | 9/1981 | United Kingdom | H02K 29/02 |
| 2 204 197 | 11/1988 | United Kingdom | H02P 6/02 |

OTHER PUBLICATIONS

"The Characteristics, Design and Applications of Switched Reluctance Motors and Drives", by Stephenson and Blake, presented at the PCIM '93 Conference and Exhibition at Nurnberg, Germany, Jun. 21–24, 1993.

Primary Examiner—Steven L. Stephan
Assistant Examiner—B. Mullins
Attorney, Agent, or Firm—Patterson & Keough, P.A.

[57] ABSTRACT

An optical position transducer circuit for an electrical machine, for example a switched reluctance machine, comprises an optical transmitter, an optical sensor and an encoder disc in the path between the transmitter and the sensor. The disc is formed with apertures and light-blocking areas in between in accordance with a digital position code. The optical position transducer is energized by an enabling circuit. When the machine is not in use but in a standby mode, the enabling circuit is responsive to a signal from a controller to disable the transducer and to enable the transducer when an input demand signal is received from the controller. Selective enablement of the transducer considerably extends its lifetime and reduces current consumption in the standby mode.

14 Claims, 4 Drawing Sheets

ELECTRICAL MACHINE DRIVE SYSTEM INCLUDING AN OPTICAL POSITION TRANSDUCER CIRCUIT AND METHOD OF OPERATING

BACKGROUND OF THE INVENTION

1. Field of the Invention

This invention relates to an electrical machine drive system. The invention is particularly, though not exclusively, applicable to such a system having an optical transducer circuit arranged as a rotor position transducer for providing rotor position information for the electrical machine.

In many situations an electric machine, whether it be a motor or a generator, has to remain on standby for extended periods. In the standby condition, the circuit controlling the machine must be kept in a state of readiness to generate and transmit the various control signals.

2. Description of Related Art

An optical position transducer is a device that produces position information in the form of pulses derived from the modulation of the output of an optical transmitter. A rotor position transducer ("RPT") for an electrical machine can comprise a source of electromagnetic radiation, commonly infra-red radiation, a sensor responsive to the radiation and a member, such as a disc mounted to move with the rotor, shaped intermittently to interrupt the light passing between the transmitter and the sensor in accordance with a pre-scribed digital code.

A common form of rotor position transducer has a transmitter and sensor arranged on either side of the member so that the code formed in the member, in the form of light-passing and light-blocking regions, modulates the output of the sensor as the member moves. Another form of sensor has alternately light-reflecting and light-absorbing regions and the sensor is arranged on the same side of the disc as the transmitter to receive the reflected light.

The useful lifetime of an optical device is difficult to predict, since it is dependent on the current fed to the transmitter and on the ambient temperature during operation. While the current is, to some extent, under the control of the designer of the RPT, reducing it will show an increase in lifetime but too large a reduction will reduce the accuracy of the device. Where the ambient temperature is fluctuating widely, (eg. in a motor which spends long periods on standby interspersed with periods of duty) it is even more difficult to predict the lifetime.

Up to now, changing from a standby state of readiness to a working mode for an electrical machine has required more than just connecting a source of electrical power to the overall system from a state of complete de-energization. The standby state has included constant energization of, for example, various aspects of the control circuit. An example of an application for an electric motor involving long periods in a standby condition is as the motive power for a vehicle, for example a pallet truck or fork-lift truck in a warehouse or other storage facility. Such trucks may have to be left in a standby condition for a considerable period until they are required. For example, a design condition for a pallet truck will typically require it to have a lifetime in the region of ten years in a standby condition, but only be expected to be run for around 20,000 hours in that standby lifetime.

Applications of this kind (eg. pallet trucks) have usually used types of motors (eg. DC motors) which do not require a position encoder. Hence the difficulty of RPT lifetime prediction has not previously been a problem. In applications of switched reluctance motors involving long periods in the standby condition, use has been made of RPT's based on, for example, Hall-effect devices even though they are less precise. This is because they are less prone to deterioration in the standby condition.

SUMMARY OF THE INVENTION

It is an object of the invention to provide an electrical drive system, including an optical position transducer, that is able to use the transducer more efficiently, thereby extending its useful working life.

It is a further object of the invention to reduce the power consumed by an optical transducer in an electrical machine drive system.

According to an embodiment of the invention there is provided an electrical machine drive system comprising: an electrical machine; a switch arrangement actuatable to supply electrical power to the machine; and an optical position transducer circuit, the optical position transducer circuit comprising an optical transmitter having an electromagnetic output, an optical sensor having an electrical output and being arranged to receive the output from the transmitter, an encoder member movable in the path of the output from the transmitter to modulate the output of the transmitter reaching the sensor, and an enabler including a controller responsive to an input to supply electrical power to energize the optical transmitter and the sensor, the controller also being responsive to a drive demand signal to actuate the switch arrangement and to actuate the enabler to energize the transmitter and the sensor.

Also according to an embodiment of the invention there is provided a method of operating an electrical machine drive system comprising: an electrical machine; a switch arrangement actuatable to supply electrical power to the machine; and an optical position transducer circuit, the optical position transducer circuit comprising an optical transmitter having an electromagnetic output, an optical sensor having an electrical output and being arranged to receive the output from the transmitter, an encoder member movable in the path of the output from the transmitter to modulate the output of the transmitter reaching the sensor, and an enabler including a controller responsive to an input to supply electrical power to energize the optical transmitter and the sensor, the controller also being responsive to a drive demand signal to actuate the switch arrangement and to actuate the enabler to energize the transmitter and the sensor, the method comprising:

energizing the machine in response to the drive demand signal;

enabling the optical position transducer circuit in response to the drive demand signal;

de-energizing the machine when the drive demand signal is not present; and disabling the optical position transducer circuit when the drive demand signal is not present.

The optical position transducer circuit according to an embodiment of the invention is enabled only for periods when it is to provide position information. This has no effect on the performance of the transducer, but is found to increase its lifetime significantly. This, in turn, leads to increased reliability of any electrical machine system of which the circuit is a part. Furthermore, current consumption by the circuit is limited to those times when it is enabled as a transducer. In some applications the constant demand placed on the power supply for one or more optical position transducers can require a larger voltage regulator. Thus, the invention extends the lifetime of the optical position transducer, saves the power otherwise consumed by it in a standby mode, and leads to the possibility of reducing the rating of the voltage regulator.

Embodiments of the invention are particularly suitable for a system in which the input demand signal is a function of a man/machine interface rather than one involving the removal or application of a system voltage. An example of such an interface is one using a user-actuated device, such as a handle, lever or button which is movable from a 'parked' position (i.e. standby condition) to a 'start' position in which the input demand signal is created by the interface in response.

BRIEF DESCRIPTION OF THE DRAWINGS

The present invention can be put into practice in various ways, one embodiment of which will now be described by way of example with reference to the accompanying drawings in which.

DETAILED DESCRIPTION OF PREFERRED EMBODIMENTS

Figure 1:
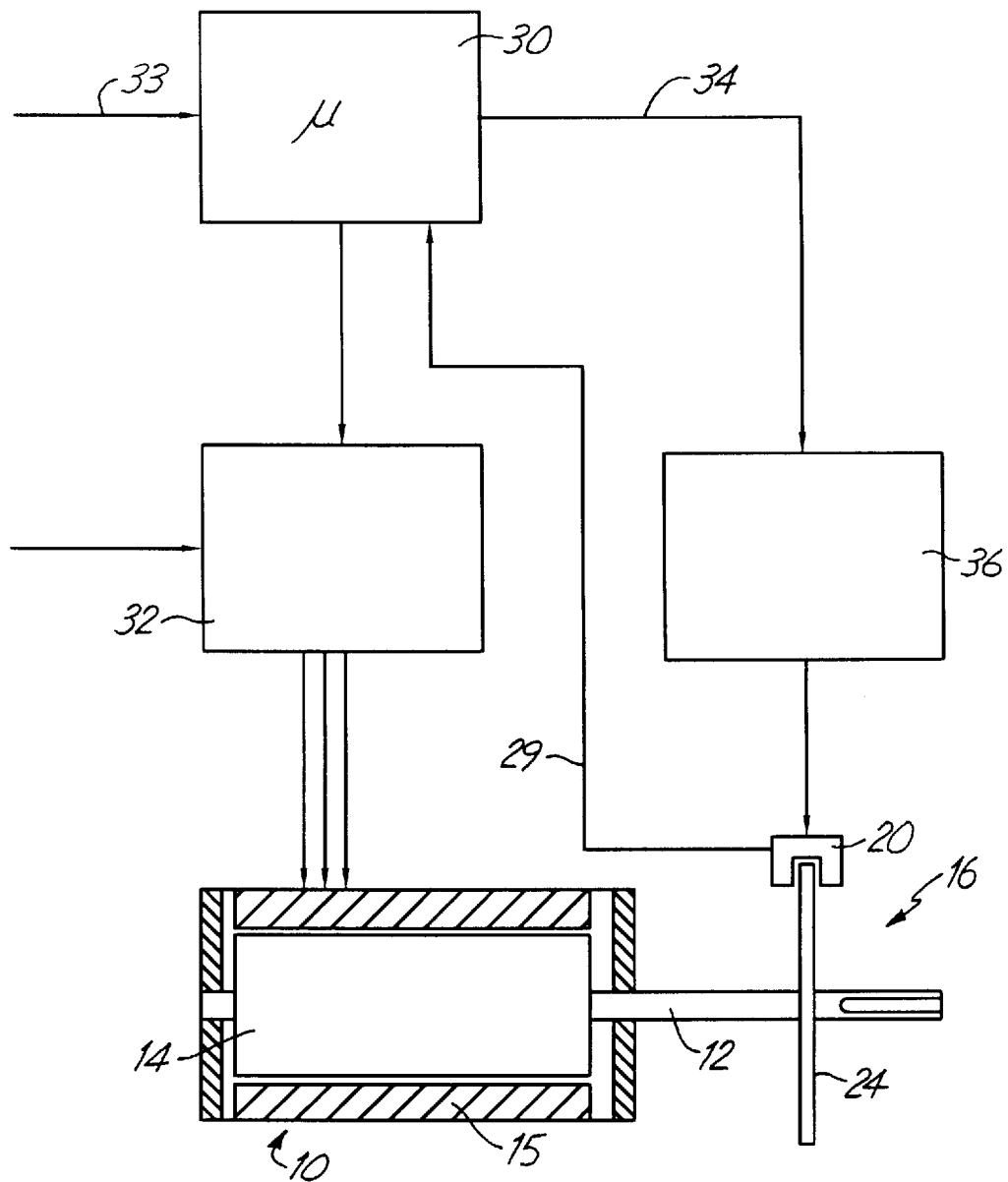
FIG. 1 is a schematic block diagram of a switched reluctance drive system incorporating a circuit according to an embodiment of the invention.
Figure 3:
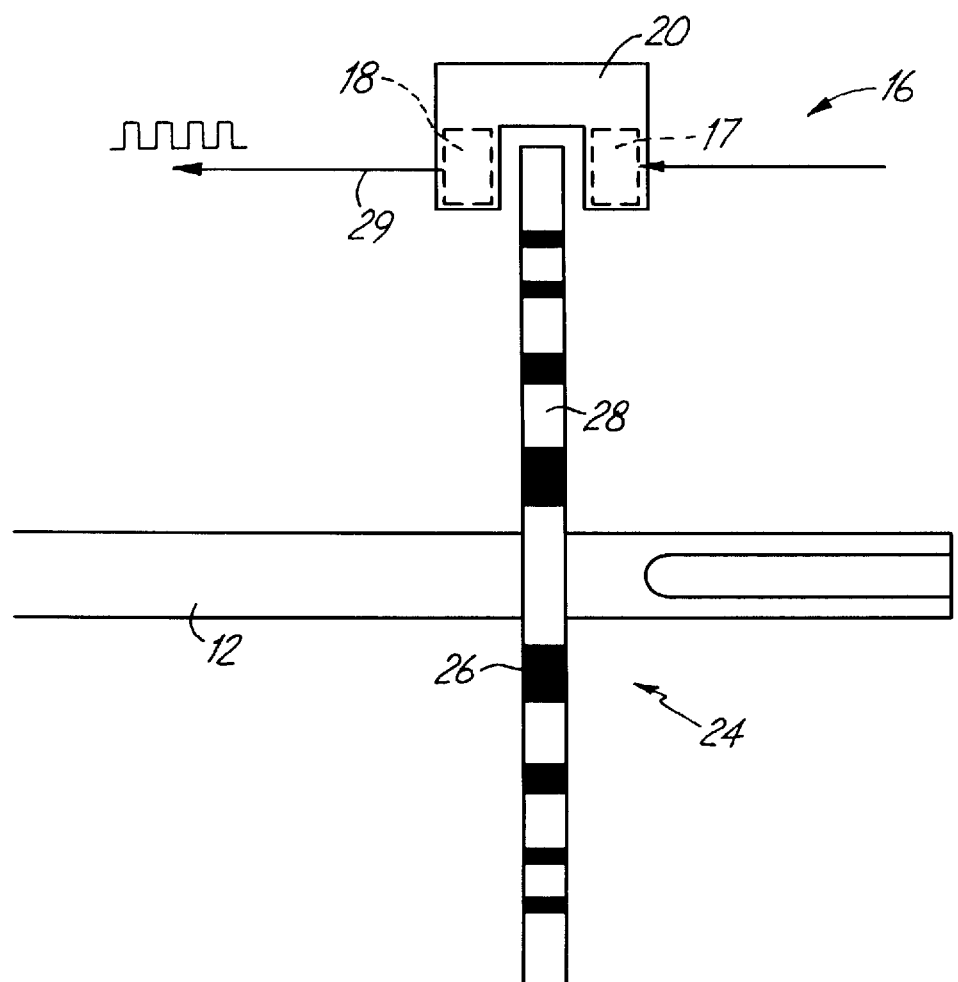
FIG. 3 is a schematic illustration of a rotor position transducer according to an embodiment of the invention.

Referring to FIG. 1, a switched reluctance drive comprises a switched reluctance motor 10 which has a drive shaft 12 attached to the motor rotor 14 which rotates within a stator 15. A rotor position transducer 16 is mounted in relation to the drive shaft 12. The rotor position transducer is illustrated in more detail in FIG. 3. It comprises an optical transmitter 17 and an optical sensor 18 which are mounted in a U-shaped body 20 on either side of an encoder disc 24 which is mounted to rotate with the shaft 12. The periphery of the encoder disc 24 is made up of a series of light-blocking parts 26 and gaps 28 between the light-blocking parts 26 in the form of a digital position code. Light transmitted from the transmitter 17 is modulated according to the rotating blocks and intervening apertures on the disc 24 according to the digital code they represent. The sensor 18 is responsive to the modulated light to produce the digital code in the form of an electrical output on line 29.

The motor 10 is controlled by a controller 30 which, in this embodiment, is a Motorola 68HC11 Microprocessor. The controller 30 actuates a switching circuit 32 which regulates the supply of current to the phase windings of the motor. Switched reluctance machines and their operation are well known to the skilled person. They are described in the paper 'The Characteristics, Design and Applications of Switched Reluctance Motors and Drives' by Stephenson and Blake, presented at the PCIM '93 Conference and Exhibition at Nurnberg, Germany, Jun. 21–24, 1993.

In order to control the motor 10, the controller 30 needs information fed back to it on the position of the rotor 14 of the motor relative to its stator 15. This is provided in a digitally encoded form by the rotor position transducer 16. In this transmissive form of transducer, or the reflective form referred to above, the digitally encoded rotor position information is supplied to the controller 30 on line 29. The controller 30 also receives an input demand signal on line 33 when the motor is to be used. This is the trigger for the controller 30 to enable the supply of power to the motor according to the demand signal and also to enable the optical transmitter 17 and the sensor 18 of the rotor position transducer 16. This is done by an output line 34 of the controller 30 that is connected to an enabling circuit 36 which is illustrated in FIG. 2.

Figure 2:
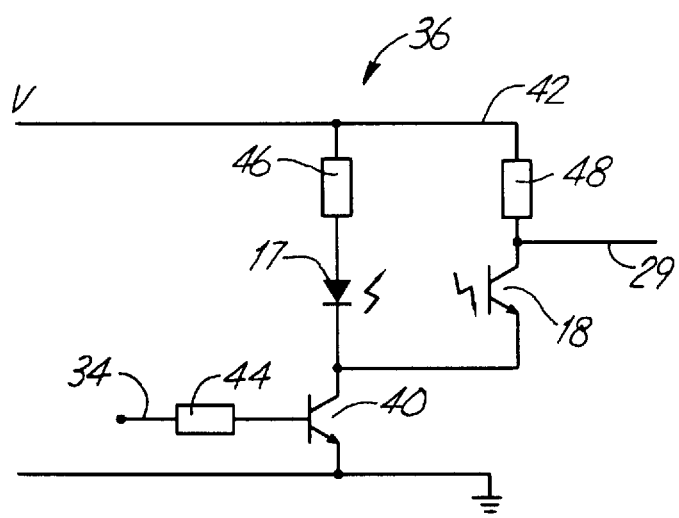
FIG. 2 is a circuit diagram according to an embodiment of the invention.

A transistor 40 of the enabling circuit 36 in FIG. 2 is connected to receive the output line 34 of the controller 30 at its base. The optical transmitter 17 is illustrated in FIG. 2 as being connected between the collector of the transistor 40 and a supply voltage rail 42 in series with resistor 46. The sensor 18 is connected between the supply rail 42 and the collector of the transistor 40 in series with resistor 48. The emitter of the transistor 40 is connected to ground. Conventional biassing and circuit-conditioning resistors 44, 46 and 48 are connected in the circuit as would be well known to the skilled person.

In the circuit of FIG. 2, the enable signal from the controller 30 causes the transistor 40 to conduct when a demand signal is received at the controller. Thus, a voltage is applied across the optical transmitter 17 and the optical sensor 18 simultaneously. The rotor position transducer is then able to provide the rotor position data to the controller according to the light blocking and light passing elements of the disc 24. When the demand signal is removed from the controller 30 the rotor position transducer 16 is disabled by the transmitter becoming non-conducting as a result of removal of the enabling signal on the output line 34. Those skilled in the art will recognize that different configurations of the resistors 44, 46 and 48 are known, and that a particular configuration will be chosen to suit a particular application.

When the motor is in a standby mode, but not in use, the controller is programmed to keep the rotor position transducer turned off. It is not consuming power nor is it being degraded in the standby mode. Its working lifetime is restricted only to those periods when it is encoding and relaying rotor position information, i.e. when the motor is actually running as opposed to being ready to run. As well as increasing the mean time between failures of the system as a whole and the optical position transducer in particular, the invention reduces the overall current consumption and, therefore, the heating of the voltage regulator supplying the supply at voltage rail 42 when the motor is at standby.

It will be appreciated that the optical transducer could be enabled in other ways. Instead of using a transistor, the enable signal could be manually applied when the motor is required to run. Alternatively, the enable signal could be generated by a logic circuit. In another form, the controller enable signal (or that from a logic circuit) could be sufficiently powerful to be the supply for energizing the optical transmitter and optical sensor of the rotor position transducer 16. This would eliminate the need for the transistor circuit while still providing a gating function according to the presence or absence of a demand signal requiring the motor to be run.

Figure 4:
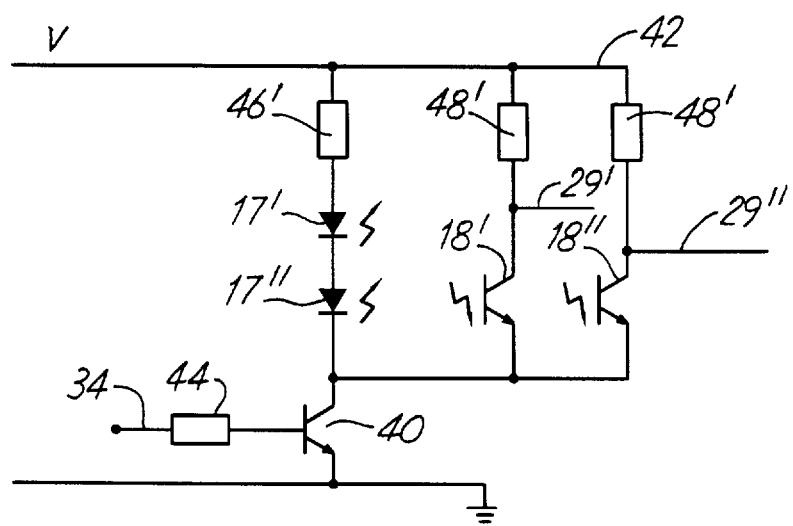
FIG. 4 is a circuit diagram of a rotor position transducer using two transmitters and sensors according to an embodiment of the invention.

It will be recognized that methods according to the invention are readily applied to rotor position transducers using two or more transmitters and sensors. For example, two transmitters 17' and 17" can be connected in series as shown in FIG. 4 (allowing the transmitter current to be conveniently set by resistor 46') and the sensors 18"and 18" are connected in parallel to give independent outputs 29' and 29".

Embodiments of the invention have been described above in relation to a rotary electrical machine. The skilled person will be aware that the invention could be applied to linear motors, such as linear reluctance motors, to equal effect. The moving member of a linear motor is often referred to as a rotor. The use of the word rotor herein is intended to embrace the moving member of a linear motor as well. The encoder member of the position transducer of a linear motor will be arranged similarly to that of a rotary machine so that it moves relative to the optical transmitting and sensing components but along a linear path.

While the invention has been described primarily in connection with the illustrated embodiments discussed above, those skilled in the art will recognize that many variations may be made without departing from the present invention. Accordingly, the above description of several embodiments is made by way of example and not for the purposes of limitation. The present invention is intended to be limited only by the spirit and scope of the following claims.

What is claimed is:

1. An electrical machine drive system comprising:
   an electrical machine;
   a switch arrangement actuatable to supply electrical power to the machine; and
   an optical position transducer circuit, the optical position transducer circuit comprising:
   an optical transmitter having an electromagnetic output;
   an optical sensor having an electrical output and being arranged to receive the output from the transmitter;
   an encoder member movable in the path of the output from the transmitter to modulate the output of the transmitter reaching the sensor;
   an enabler for enabling the optical position transducer circuit, the enabler being responsive to an input signal to supply electrical power to the optical position transducer circuit to enable the electrical output of the optical sensor; and
   a controller responsive to a drive demand signal to actuate the switch arrangement and to generate the input signal for the optical position transducer circuit, the optical position transducer circuit thereby being energized only when the controller receives a drive demand signal such that the life of the optical transducer circuit is extended.

2. The system of claim 1, in which the enabler also includes a gate circuit responsive to an output of the controller to control the supply of electrical power to the optical transmitter and the sensor.

3. The system of claim 1, in which the optical transmitter and sensor are electrically connected in parallel to receive the electrical power from the enabler.

4. The system of claim 1, in which the optical position transducer circuit is a rotor position transducer circuit.

5. The system of claim 4, in which the electrical machine has a rotatable shaft and the encoder member comprises a disc mountable to rotate with the shaft of the machine.

6. The system of claim 1, in which the electrical machine is a switched reluctance machine.

7. A method of operating an electrical machine drive system comprising:
   an electrical machine;
   a switch arrangement actuatable to supply electrical power to the machine; and
   an optical position transducer circuit, the optical position transducer circuit comprising:
   an optical transmitter having an electromagnetic output;
   an optical sensor having an electrical output and being arranged to receive the output from the transmitter;
   an encoder member movable in the path of the output from the transmitter to modulate the output of the transmitter reaching the sensor;
   an enabler for enabling the optical position transducer circuit, the enabler being responsive to an input signal to supply electrical power to the optical position transducer circuit to enable the electrical output of the optical sensor; and
   a controller responsive to a drive demand signal to actuate the switch arrangement and to generate the input signal for the optical position transducer circuit, the optical position transducer circuit thereby being energized only when the controller receives a drive demand signal such that the life of the optical transducer circuit is extended, the method comprising:
   energizing the machine in response to the drive demand signal;
   enabling the optical position transducer circuit in response to the input signal from the controller;
   de-energizing the machine when the drive demand signal is not present; and
   disabling the optical position transducer circuit when the drive demand signal is not present, the optical position transducer circuit thus being energized only when the controller receives the drive demand signal such that the life of the optical position circuit transducer is extended.

8. The method of claim 7, in which the machine is operable in response to the drive demand signal when the optical position transducer circuit is enabled.

9. An electrical machine drive system, comprising:
   an electrical machine;
   a switch arrangement actuatable to supply electrical power to the machine; and
   optical position transducer circuit means for producing position information regarding the electrical machine, the optical position transducer circuit means comprising:
   optical transmitter means for producing an electromagnetic output;
   optical sensor means for receiving the output from the transmitter means, the optical sensor means having an electrical output;
   an encoder member movable in the path of the output from the transmitter means to modulate the output of the transmitter means reaching the sensor means;
   means for enabling the optical position transducer circuit means, the means for enabling being responsive to an input signal for energizing the transmitter means and the sensor means; and
   controller means responsive to a drive demand signal for actuating the switch arrangement and for generating the input signal for the optical position transducer circuit means, the optical position transducer circuit means thus being energized only when the controller means receives a drive demand signal such that the life of the transducer circuit means is extended.

10. The system of claim 9, wherein the means for enabling includes gate circuit means, responsive to an output of the controller means, for controlling the supply of electrical power to the transmitter means and the sensor means.

11. The system of claim 9, wherein the transmitter means and the sensor means are electrically connected in parallel to receive electrical power from the means for enabling.

12. The system of claim 9, wherein the optical position transducer circuit means is a rotor position transducer circuit.

13. The system of claim 12, wherein the electrical machine has a rotatable shaft and the encoder member comprises a disc mountable to rotate with the shaft of the machine.

14. The system of claim 9, wherein the electrical machine is a switched reluctance machine.

* * * * *